(No Model.)
E. S. BREED.
OIL FILTER.
No. 483,599. Patented Oct. 4, 1892.
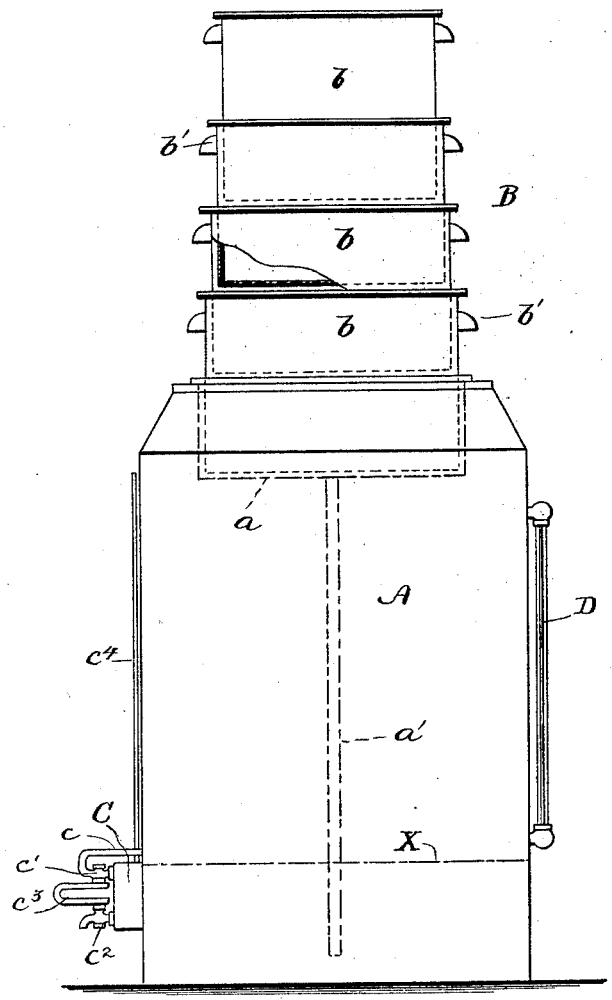
WITNESSES:
Frank S. Ober
Wm. R. Rosenbaum
INVENTOR
Edwin S. Breed
BY
W. D. Johnston
ATTORNEY.

UNITED STATES PATENT OFFICE.

EDWIN S. BREED, OF PATERSON, NEW JERSEY.

OIL-FILTER.

SPECIFICATION forming part of Letters Patent No. 483,599, dated October 4, 1892.

Application filed April 30, 1890. Serial No. 350,005. (No model.)

*To all whom it may concern:*

Be it known that I, EDWIN S. BREED, a citizen of the United States, residing in Paterson, in the county of Passaic and State of New Jersey, have invented certain new and useful Improvements in Oil-Filters, of which the following is a specification.

My invention relates to oil-filters; and my object is to produce an efficient device whereby oil may be filtered and washed.

My invention consists in the construction and combination of parts, as hereinafter described and claimed.

In the accompanying drawing, the figure is a side elevation of my complete filter.

A indicates the can or main receptacle for the oil after it has been filtered, and B indicates the filter. This filter consists of a series of trays $b$, which nest into each other. Each of these trays has a reticulated bottom. The upper portion of the can A has an opening, and in this opening is secured a reticulated or foraminous receptacle $a$, and in this fits the lower tray $b$. Each tray is provided with handles $b'$ and is to be filled to any desired depth with any suitable filtering material. The bottom of each tray rests upon the top of the filtering material in the tray beneath it. From the bottom of the receptacle $a$ a pipe $a'$ leads to or nearly to the bottom of the can A.

C indicates a measuring device secured to the outside of the can A at any preferred height from the bottom thereof, preferably about one-third.

D indicates an ordinary glass gage secured to the can A to indicate the height of the oil contained.

In operation water is placed in the can A to the level of the upper part of box C, as indicated by the dotted line X in Fig. 1, and the trays $b$ are supplied with filtering material and placed in position as indicated in the drawing. Oil is supplied from any suitable source to the upper tray and filters down through the series of trays and through pipes $a'$ to the bottom of the can. Therefore any impurities in the oil which succeed in passing the filter B and which have a specific gravity greater than that of water remain at the bottom of the can.

Having described my invention, what I claim, and desire to secure by Letters Patent, is—

An oil-filter consisting of the combination, with a can or vessel, of a plurality of trays having plain perforated bottoms and vertical sides, the lowest tray fitting in the mouth of the can and each of the others in succession fitting within the tray below it and resting upon the filtering material therein and the several trays being of substantially uniform depth, substantially as described.

In witness whereof I have hereunto signed my name in the presence of two subscribing witnesses.

EDWIN S. BREED.

Witnesses:
EUGENE STEVENSON,
EDWARD H. ROLLINS.